United States Patent
Rath et al.

(10) Patent No.: US 9,374,807 B2
(45) Date of Patent: Jun. 21, 2016

(54) UPLINK TRANSMISSION SCHEDULING FOR WIRELESS COMMUNICATION NETWORKS

(71) Applicant: Tata Consultancy Services Limited, Mumbai (IN)

(72) Inventors: Hemant Kumar Rath, Bangalore (IN); Munmun Sengupta, Bangalore (IN); Anantha Simha, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 72 days.

(21) Appl. No.: 14/204,933

(22) Filed: Mar. 11, 2014

(65) Prior Publication Data
US 2015/0029950 A1 Jan. 29, 2015

(30) Foreign Application Priority Data

Jul. 24, 2013 (IN) .......................... 2464/MUM/2013

(51) Int. Cl.
*H04W 72/04* (2009.01)
*H04W 76/00* (2009.01)
*H04W 72/12* (2009.01)

(52) U.S. Cl.
CPC ........ *H04W 72/0413* (2013.01); *H04W 72/042* (2013.01); *H04W 76/00* (2013.01); *H04W 72/12* (2013.01)

(58) Field of Classification Search
None
See application file for complete search history.

(56) References Cited

U.S. PATENT DOCUMENTS

| | | | | |
|---|---|---|---|---|
| 8,582,514 | B2* | 11/2013 | Moberg | H04W 72/1284 370/329 |
| 8,913,494 | B1* | 12/2014 | Marupaduga | H04W 28/0231 370/230 |
| 2009/0204867 | A1* | 8/2009 | Ho | H04L 1/1887 714/749 |
| 2009/0310487 | A1* | 12/2009 | Eriksson | H04L 47/10 370/235 |
| 2010/0208614 | A1* | 8/2010 | Harmatos | H04L 47/215 370/253 |
| 2010/0322069 | A1* | 12/2010 | Song | H04W 28/24 370/229 |
| 2011/0199900 | A1* | 8/2011 | Ludwig | H04L 41/0893 370/230.1 |

(Continued)

FOREIGN PATENT DOCUMENTS

WO 2009/116939 A2 9/2009

OTHER PUBLICATIONS

Kwon et al., "Uplink QoS Scheduling for LTE System," Digital Media and Communications Division, Samsung Electronics Co. Ltd, Suwon, Korea, Dec. 2011, 5 pages.

(Continued)

*Primary Examiner* — Hassan Kizou
*Assistant Examiner* — Hashim Bhatti
(74) *Attorney, Agent, or Firm* — Seed IP Law Group PLLC (57) ABSTRACT

A method for uplink scheduling over a communication channel in a communication network including at least one UE and an eNodeB, is described. The method comprises determining whether the UE is associated with at least one of Guaranteed Bit Rate (GBR) bearers and non-Guaranteed Bit Rate (non-GBR) bearers. Based on the determining, for each of the GBR-bearers and the non-GBR-bearers, computing a demand for resources for establishing an uplink communication, wherein the demand is computed based physical layer characteristics and transport layer characteristics associated with the communication channel. The demand computed is communicated as a request message to the eNodeB. In response to the request message, receiving an allocation of the resources for uplink scheduling from the eNodeB.

16 Claims, 8 Drawing Sheets

(56) References Cited

U.S. PATENT DOCUMENTS

2011/0249565 A1* 10/2011 Stjernholm ......... H04L 12/5695
370/241
2012/0250603 A1* 10/2012 Huang .............. H04W 72/1257
370/315
2014/0066084 A1* 3/2014 Paladugu ............. H04W 28/24
455/452.2
2014/0073342 A1* 3/2014 Lioulis ................. H04W 64/00
455/452.2
2014/0256344 A1* 9/2014 Yu ........................ H04W 28/16
455/452.2
2014/0321288 A1* 10/2014 Ha .................... H04W 28/0268
370/237

OTHER PUBLICATIONS

Salah, "Comparative Performance Study of LTE Uplink Schedulers," Thesis, Department of Electrical and Computer Engineering, Queen's University, Kingston, Ontario, Canada, Apr. 2011, 149 pages.

* cited by examiner

UPLINK TRANSMISSION SCHEDULING FOR WIRELESS COMMUNICATION NETWORKS

FIELD OF INVENTION

The present subject matter relates to wireless communication networks and, particularly, but not exclusively, to uplink transmission scheduling for wireless communication networks.

BACKGROUND

Wireless communication networks offer a variety of applications and services, such as multimedia interactive applications, Voice over IP (VoIP), and video conferencing. Support for such services is typically being provided by communication networks providing high data transfer speeds and bandwidths. Examples of such technologies include WiMAX® and Long Term Evolution (LTE).

Wireless communication network services are also, becoming increasingly popular with the users because they are available anywhere at anytime. Users use wireless communication devices, such as cellular phones, smart phones, notebooks, tablets and personal digital assistants (PDAs) to access the services. Service providers governing the wireless communication networks are faced with a challenge to meet user demands of high speed data connectivity at all places and all the time. With users using applications that are data intensive like video conference calling, high data rate internet connectivity, live media streaming, audio and video downloading/streaming, online gaming, and real time social networking, users' demand for high speed data connectivity is also, increasing. This in turn, leads to a requirement that the communication network, in general, operates in an optimum manner.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example, and with reference to the accompanying figures, in which.

In the present document, the word "exemplary" is used herein, to mean "serving as an example, instance, or illustration." Any embodiment or implementation of the present subject matter described herein, as "exemplary" is not necessarily to be construed as preferred or advantageous over other embodiments.

DESCRIPTION OF EMBODIMENTS

Methods and systems for uplink scheduling based on transport layer and physical layer characteristics are described. The methods can be implemented in various computing and hand-held devices communicating through various networks. Although the description herein, is with reference to LTE networks, the methods and systems may be implemented in other wireless communications, albeit with a few variations, as will be understood by a person skilled in the art.

LTE networks, which are mainly centralized in nature, may be divided broadly into an access network and a core network. The access network includes user equipment (UE), which includes wireless network devices used by users to use services available through LTE based networks. The access network also, includes a centralized base station, referred to as eNodeB in LTE based networks. One or more UEs connect to the eNodeB over a radio interface. The core network includes network elements that provide services to the UE through the eNodeB and also, interfaces the eNodeBs with other communication networks or the Internet. The eNodeB facilitates the UE to transmit data to the core network, referred to as transmission in the uplink and the eNodeB also, facilitates the UE to receive data from the core network, referred to as transmission in the downlink.

In LTE, data is transmitted in the form of packets both in the uplink and the downlink using resources. The resources used for transmission in the uplink may be understood as time slots for transmission. Since several UEs may be involved in uplink transmission, the scheduling of transmission of packets from each UE is performed by the eNodeB to ensure sharing of resources. Uplink and downlink transmission of data may be done over the TCP protocol stack. The TCP protocol stack standardizes telecommunication between different network elements by defining layers of communication. Each layer may be understood to have a function towards transmission of data. TCP layers of communication include a physical layer, a medium access layer, a network layer and a transport layer. The protocol for communication on the transport layer may be transmission control protocol (TCP) or user datagram protocol (UDP).

Conventionally, scheduling of transmission of data in the uplink transmission may be based on a round robin scheduling. In round robin scheduling techniques, several UEs send requests for resources to the eNodeB. The eNodeB allocates a predetermined number of resources to each UE, by regular turns. However, such mechanisms do not consider the characteristics or attributes of various layers of TCP protocol stack realized in the scheduling process. For example, applications utilizing TCP suffer significantly in terms of throughput resulting from improper scheduling.

Such issues arise due to the inherent nature of TCP, which updates its transmission rate in an adaptive manner based on congestion in the channel. Moreover, significant variations in instantaneous individual user throughput, may result due to the time-varying and frequency selective nature of the channel. Such issues related to the physical layer and transport layer are typically addressed by deploying corrective mechanisms at the Media Access or the MAC layer scheduling. However, such mechanisms do not ensure any Quality of Service (QoS) guarantee at the transport layer, resulting in unfairness and throughput degradation for such communication based on TCP.

According to an implementation of the present subject matter, systems and methods for scheduling uplink transmission in an LTE network are described. In accordance with an implementation of the present subject matter, the uplink scheduling is based on transport layer and physical layer characteristics or parameters of the uplink communication channel. In one implementation, uplink scheduling is based on the demand for resource blocks as determined by one or more UEs, which may be in communication with an eNodeB, under consideration. Depending on the computed demand, the resource blocks to be allocated are determined and assigned to the respective UEs.

Each of the UEs may be associated with either Guaranteed Bit Rate (GBR)-bearers or non-GBR-bearers. In some cases, the UE may even be associated with both GBR-bearers and non-GBR-bearers. A bearer, which in the context of LTE is also known as an Evolved Packet System (EPS) bearer, can be understood as a communication link between any UE and one of the networking entities. GBR-bearers can be understood to be specialized channels which are protected from congestion related packet losses. For such bearers, maintaining the quality of the service is preferential over providing resources for any additional services. Conversely, for non-GBR-bearers providing resources for the incoming requested services is preferential. In one implementation, the demand is computed separately for GBR-bearers and non-GBR-bearers.

For scheduling uplink transmission, a UE intending to transmit data in the uplink of a wireless communication network, communicates a request to the eNodeB, along with parameters such as a demand and Quality Class Indicator (QCI). The QCI indicates specific parameters relevant for transmission of packets, such as priority and packet delay budget. The QCI is indicative of parameters used for forwarding packets in the LTE network. As is also commonly understood, for any communication link, QCI may be pre-defined.

On receiving the request from the UE, the number of resources to be allocated to each of the UEs is determined. In one implementation, the resources are represented as resource blocks. As is known in the art, a resource block (also referred to as RB) can be considered as the smallest unit of radio resource available in the physical layer of an LTE based communication network, which may be spread over 12 sub-carriers in the frequency domain and one slot (0.5 msec) in time domain.

Once the resource blocks to be allocated are determined, the same are allocated for the UEs depending on the GBR-bearers and the non-GBR-bearers associated with the UEs. According to one implementation of the present subject matter, UEs with GBR-bearers are first allocated the resource blocks. Once the resource blocks for the GBR-bearers are allocated, the remaining resource blocks are subsequently, allocated for non-GBR-bearers. In one implementation, the resource blocks for the non-GBR-bearers are allocated based on a variety of parameters. Examples of such parameters include, but are not limited to, Packet Delay Budget (PDB) and priority associated with the UEs. Once the resource blocks are allocated to the UEs with GBR-bearers and the non-GBR-bearers, the same are subsequently, assigned. In one implementation, the assigning of the resource blocks to the respective GBR-bearers and the non-GBR-bearers is based on parameters correlated with maximum coding efficiency.

As will be shown later in the present description, the present subject matter increases the efficiency by way of an increase in the average number of packets transmitted. Further, the average packet drop during transmission of packets is also, lowered according to an implementation of the present subject matter. Unutilized resources are also, minimized according to the present subject matter.

It would be appreciated by a person skilled in the art that the claimed subject matter for uplink scheduling for uplink flows in LTE, is also applicable for mechanisms suitably adapted to resource management through demand computation in basic services such as labour, electricity, water, road traffic, etc. In such cases, a central programmable entity may be configured to grant and assign resources, such as resource blocks, manpower, or services based on the demand received from the users. The demand can be computed by the user (citizens or others) based on the priority of the service, application requirement and time required to provide the service, etc. The demands can be received through periodic requests (i.e., polling requests) or as and when requests (demand, priority type, service type such as normal, critical, etc.) are received (similar to a contention mode). In one implementation, the present subject matter can be extended to QoS guarantee in smart city applications, surveillance, disaster management, telemedicine, etc., and can also be utilized for modeling demand for delay tolerant traffic in satellite networks. Such implementations would be within the scope of the present subject matter.

The proposed scheduling as per the present subject matter can also be suitably adapted based on a Program Evaluation and Review Technique/Critical Path Method (PERT/CPM), based on techniques conventionally known in the art. As would be known to a person skilled in the art, PERT is a statistical tool used in program management that is designed to analyze and represent tasks involved in completing one or more given projects. Within such tools, scheduling may be based on CPM. A person skilled in the art can adapt the proposed method to compute demand of various projects with different QoS requirement (similar to RTT, throughput, delay, congestion window, etc) and the capability (similar to reported rate) and then can suitably adapt the proposed scheduling and assignment techniques for appropriate CPM algorithm. Furthermore, the present subject matter is explained through implementations that are based on LTE-networks. However, the same can also be implemented using distributed system, like Wireless LAN/Adhoc Networks, without deviating from the scope of the present subject matter.

It should be noted that the description merely illustrates the principles of the present subject matter. It will thus, be appreciated that those skilled in the art, will be able to devise various arrangements that, although not explicitly described herein, embody the principles of the present subject matter and are included within its spirit and scope. Furthermore, all examples recited herein, are principally intended expressly to be for pedagogical purposes to aid the reader in understanding the principles of the invention and the concepts contributed by the inventor(s) to furthering the art, and are to be construed as being without limitation to such specifically recited examples and conditions. Moreover, all statements herein, reciting principles, aspects, and embodiments of the invention, as well as specific examples thereof, are intended to encompass equivalents thereof.

Figure 1:
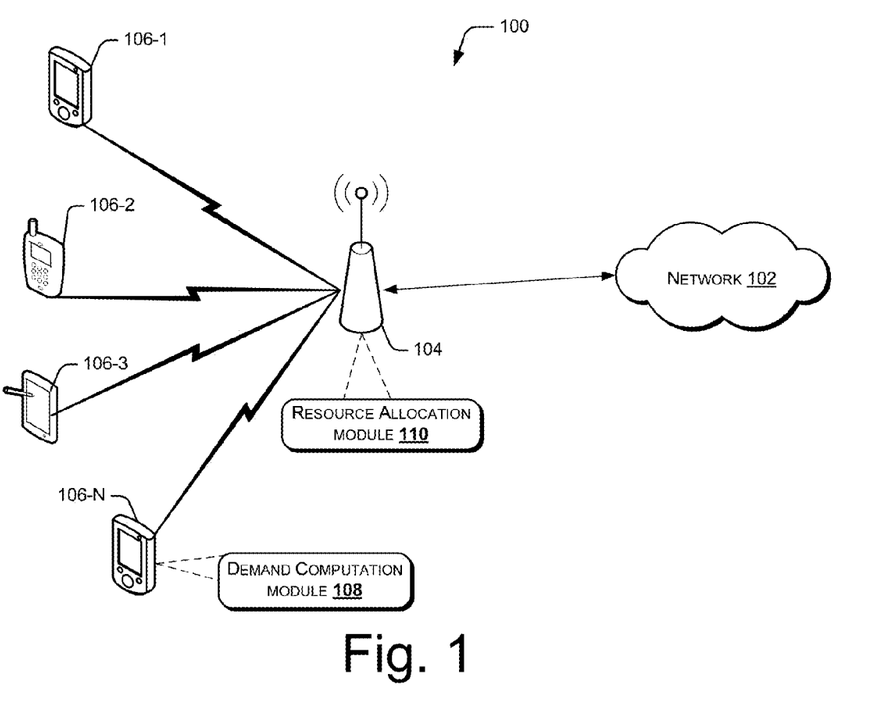
FIG. 1 illustrates an exemplary wireless communication network environment, according to an embodiment of the present subject matter.

FIG. 1 illustrates a LTE communication environment 100 operated by service providers to offer telecom services to users of the service provider, according to an embodiment of the present subject matter. The LTE communication environment 100 comprises the network 102, an eNodeB 104 and a plurality of user equipments, i.e., UEs 106-1, 106-2, 106-3, . . . , 106-N. The UEs 106-1, 106-2, 106-3, . . . , 106-N are collectively, referred to as UEs 106, and individually, referred to as UE 106, hereinafter. The UEs 106 further, include a demand computation module 108, and the eNodeB 104 includes a resource allocation module 110.

It would be appreciated by those skilled in the art that, any block diagrams herein, represent conceptual views of illustrative systems embodying the principles of the present subject matter. Similarly, it will be appreciated that any flow charts, flow diagrams, state transition diagrams, pseudo code, and the like, represent various processes which may be substantially represented in computer readable medium and so, executed by a computer or processor, whether or not such computer or processor is explicitly shown.

As would be appreciated, one or more of the UEs 106 can avail a variety of services which involves communicating data from and to the communication network 102. The communication network 102 can be implemented using a plurality of network entities. For example, in case the communication network is an LTE based communication network, the network entities may include a serving Gateway (Serving GW), a Packet Data Network Gateway (PDN GW), the Mobility Management Entity (MME) and the Home Subscriber Server (HSS), which are presently not shown in the figure. Furthermore, the communication network 102 can further, include various interfaces for establishing a communication link with the Internet. As would be appreciated by a person skilled in the art, conventional protocols can be relied on enabling such communication between one or more network entities and other networks.

The UEs 106 are wireless communication devices, such as smart phones, tablets, and laptops, used by the users to avail wireless communication services provided by the service provider using the LTE communication environment 100.

For sake of brevity, elements of the core network have not been depicted. A person skilled in the art may appreciate that the core network comprises a Mobility Management Entity (MME), Packet data Network Gateway (PGW). In LTE communication environment 100, the connectivity for UEs 106 to the network 102 is provided by eNodeB 104. The communication between the UEs 106 and the eNodeB 104 is through a radio interface.

In both the cases explained earlier, that is, the UEs 106 using wireless communication services for communication amongst themselves and the UEs 106 communicating with the network 102, the UEs 106 interface with the eNodeB 104 and the communication is routed through a core network, such as communication network 102 to enable the wireless communication services. The UEs 106 may download information, such as when receiving video streaming data or while receiving a page while browsing the Internet. The link used for data transmission from the eNodeB 104 to the UEs 106 while downloading information is called the downlink. Similarly, when the UEs 106 are uploading data, such as uploading photos into a server, or transmitting voice in a VoIP services, the UEs 106 uses an uplink for data transmission. The uplink is used for data transmission for data being sent from the UEs 106 to the eNodeB 104. As and when data from one or more of the UEs 106 is to be communicated to other UEs 106, an uplink is to be established to the eNodeB 104. To this end, various resources are to be allocated to the UE, say UE 106-1, for establishing the uplink. For each uplink, various bearers or channel are to be established between the UE, say UE 106 and the eNodeB 104.

For ease of explanation, 'N' number of UEs, are considered to be connected to the eNodeB 104, where 'N' is a positive integer. It is further considered that one or more services which require transmitting data in the uplink are executed on or through the UE 106. Data is transmitted from the UE 106 to a packet data network gateway, an element of the core network. Data is transmitted over a link between the UE 106 and the PGW, referred to as bearer. Data transmission in bearers can be subdivided based on Guaranteed Bit Rate (GBR) and non-Guaranteed Bit Rate (non-GBR). Consequently, such bearers are referred to as GBR bearers and non-GBR bearers, respectively.

As the name indicates, GBR bearers can be understood to be bearers which transmit data at a guaranteed bit rate and in case of non-GBR bearers, the bitrates for transmission is not guaranteed. Services using GBR are guaranteed a minimum bit rate and are configured, such that they do not experience any data loss during transmission. Whereas, services using non-GBR applications may tolerate packet loss and are not guaranteed a minimum bit rate. Within this environment 100, each of the UEs 106 can be associated with a GBR bearer, a non-GBR bearer or a combination of both.

According to an implementation of the present subject matter, services requiring GBR transmission and non-GBR transmission are determined. Once determined, the demand computation module 108 calculates a demand for the resources for the respective bearers. For purposes of illustration, it is indicated that the UE 106-N includes the demand computation module 108. However, other UEs 106 may further, include respective demand computation module 108 without deviating from the scope of the present subject matter.

In one implementation, the demand is calculated in the form of resource block, referred to RBs, for allocation to the respective, GBR and non-GBR bearers. The demand computation module 108 computes the demand for the GBR bearer and the non-GBR bearer based on a combination of transport layer parameters and physical layer parameters. In one implementation, the physical layer parameters may include, but not limited to, the maximum reported rate of each of the respective UEs 106. Similarly, while computing the demand for resource blocks based on transport layer parameters, the UEs 106 may further, determine the demand based on the TCP and the UDP data flows. For example, while evaluating the resource blocks considering the TCP data flow, the calculation of the demand can be based on congestion window parameter. On the other hand, while the demand for UDP data flows is to be evaluated, parameters such as throughput can be considered.

Once the demand is calculated by the demand computation module 108, a Quality of Service (QoS) class indicator referred to as QCI, is determined by the demand computation module 108. In one implementation, the QCI can be determined based on the type of bearer associated with the UE. As would be understood, the QCI may denote a set of transport characteristics such as priority, packet delay budget, packet error loss rate, and the QCI value can be used to infer specific parameter packet forwarding treatment, such as scheduling weights, link layer protocol configuration and admission thresholds. It would be noted that QCI for various services can be pre-defined or can be standardized. In the said implementation, the UE 106 transmits the demand for each of the GBR and the non-GBR bearers, along with QCI by the UE 106 to the eNodeB 104.

In one implementation, once the demand is computed by the demand computation module 108, each of the UEs 106 updates the eNodeB 104 with the computed demand for GBR bearers, the computed demand for non-GBR bearers, and the QCI. In one implementation, the GBR demand is communicated to the eNodeB 104 as Maximum Bit Rate (MBR), whereas the non-GBR demand is communicated as an Aggregate Maximum Bit Rate (UE-AMBR).

On receiving the demand, the eNodeB 104 initiates the scheduling and the allocation of the resource blocks based on the received demand. In one implementation, the resource allocation module 110 computes the number of RBs for each of the UEs 106 from whom the requests were received.

In another implementation, the eNodeB 104 receives requests from UE 106 through polling techniques or contention-based techniques. In polling-based technique, each of the UEs 106 may be polled periodically, and requests may be received for every fixed number of consecutive data frame, such as every M frames, wherein M is a positive integer. In contention based technique, each UE 106 requests or contends at a pre-defined frequency and time slot. In case the request suffers a collision from another UE 106, at that instant of time when the request from UE 106 was received, the UE 106 may choose to re-send the request.

In one implementation, the number of resource blocks available at the eNodeB 104 is computed differently for different duplex modes. The LTE communication network 100 typically may support two duplex modes, Frequency Division Duplex (FDD) and Time Division Duplex (TDD), both emulating full duplex transmission, that is both allowing transmission in the uplink and the downlink. In FDD, the downlink transmission and uplink transmission are on two different frequencies. Whereas in TDD, the downlink and uplink transmission is on the same frequency but they are on a different time slots, that is, each of uplink and downlink transmissions are allocated different time slots.

The present subject matter has been discussed with respect to TDD, although a person skilled in the art may appreciate that the present subject matter may be extended for a LTE communication environment 100 based on FDD with relevant modifications, without deviating from the scope of the present subject matter. In TDD transmission, frames are allotted for transmission of data between the UE 106 and the eNodeB 104. In TDD, 'M' continuous frames are allocated in each iteration, where M is a positive integer.

Once the GBR and non-GBR demand is communicated to the eNodeB 104, the eNodeB 104 then, determines number of resource blocks for each of the UEs 106. Before the allocation of the resource blocks proceeds, the eNodeB 104 may further, determine the total number of resource blocks that are available for allocation. In case, the number of resource blocks which are available are greater than the number of resource blocks as per the requests received from the UEs 106, resource blocks for one or more of UEs 106, say UE 106-1, which are associated with GBR-bearers are allocated initially. In case, the total number of available resource blocks is less than the resource blocks for the total number of incoming request, then one or more of the UEs 106 are allocated resource blocks in proportion of the MBR for the one or more of the UEs 106 which are associated with the GBR-bearers. Subsequent allocation of resource blocks may occur while allocating resource blocks for the next frame.

Returning to the case, when the number of resource blocks available is greater than the number of resource blocks that are to be allocated, once the resource blocks are allocated for the UEs 106 with GBR-bearers, the eNodeB 104, or the resource allocation module 110 further, evaluates the resource blocks that are to be allocated for the non-GBR-bearers. For allocating the resource blocks for the non-GBR-bearers, the resource allocation module 110 may first determine the number of resource blocks that are left after allocation of resource blocks for the GBR-bearers. The remaining resource blocks are subsequently, utilized for allocating the non-GBR-bearers. To allocate the resource blocks for the non-GBR-bearers, each of the UEs 106 can be sorted based on one or more parameters, for example the priority associated with the respective UEs 106. The UEs 106 with higher priority, are allocated the resource blocks initially. In one implementation, the number of resource blocks for the non-GBR-bearers is determined based on the UE-AMBR and the packet delay budget (PDB). These and other aspects will be discussed in greater detail, in conjunction with FIG. 2. In one implementation, the process of allocation of the resource blocks continues for all UEs 106 in the order of priority, till all the resource blocks have been allocated.

Once the appropriate number of resource blocks is determined, the eNodeB 104 assigns the requisite number of resource blocks to the respective UEs 106. In one implementation, the eNodeB 104 may determine the resource blocks to be allocated and mapped to a UE such that maximum coding efficiency is achieved. For this, the principle of opportunistic scheduling can be used. Accordingly, the numbers of resource blocks capable of a higher coding efficiency are assigned first.

Figure 2:
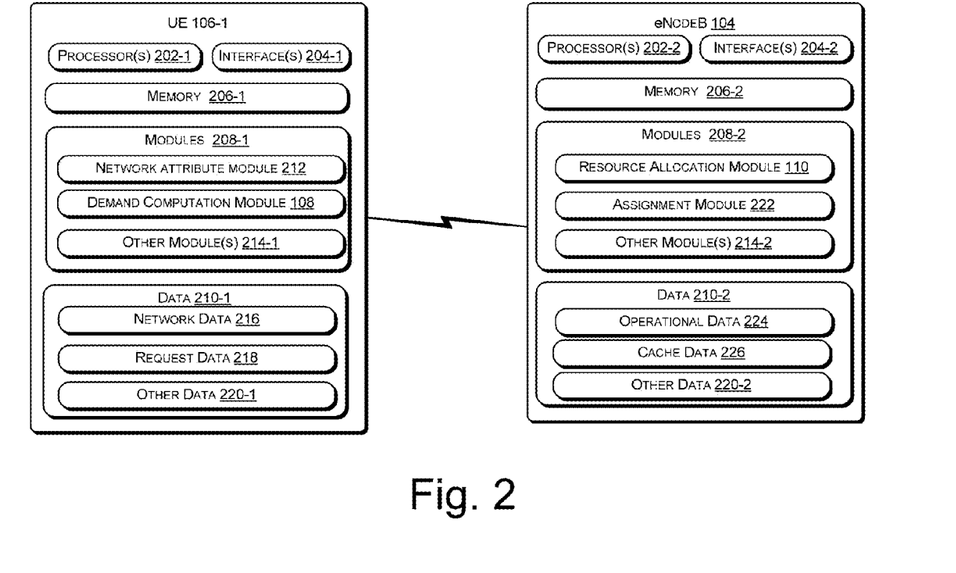
FIG. 2 schematically illustrates a user equipment (UE) and an eNodeB for uplink scheduling, based on transport layer and physical layer characteristics, according to an embodiment of the present subject matter.

FIG. 2 illustrates modules of different network elements of the LTE communication environment 100, for transmission of data in the uplink. In many cases, multiple network entities besides those shown may be configured between the entities, including transmitting stations, switching stations, and communication links, although those have been omitted for clarity. Similarly, various acknowledgement and confirmation network responses may also be omitted from the present description for the sake of clarity.

The different components of the eNodeB 104 and a UE, such as the UE 106 are shown in FIG. 2. It would be understood that the functionalities associated with the eNodeB 104 and the UE 106, or equivalents thereof, may be implemented in a different manner also, without digressing from the scope and spirit of the present subject matter. Further, although the description of FIG. 2 has been provided with respect to an LTE communication network, it will be understood that the provision of connectivity could occur in other wireless environments as well.

The explanation in LTE communication environment 100 has been explained, with respect to an LTE network with a single eNodeB 104 and UE 106-1. It may be understood that the subject matter can be implemented across an LTE network with multiple UEs several base stations.

The functions of the eNodeB 104 and the UE 106-1 described herein, are complementary to each other. Components relevant to the subject matter, with respect to the eNodeB 104 and the UE 106-1, have been shown in the figure for the ease of explanation. As explained previously in conjunction with FIG. 1, for uplink scheduling as per an implementation of the present subject matter, the UE 106-1 computes the demand for the resource blocks, and the eNodeB 104 allocates and assigns the number of resource blocks to appropriate UEs for uplink scheduling.

The eNodeB 104 and the UE 106-1 each include processors 202-1, 202-2, respectively and are collectively, referred to as processor(s) 202 hereinafter. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 is configured to fetch and execute computer-readable instructions stored in the memory.

The functions of the various elements shown in the figure, including any functional blocks labeled as "processor(s)", may be provided through the use of dedicated hardware, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed, to refer exclusively to hardware capable of executing software, and may implicitly include, without limitation, Digital Signal Processor (DSP) hardware, network processor, Application Specific Integrated Circuit (ASIC), Field Programmable Gate Array (FPGA), Read Only Memory (ROM) for storing software, Random ccess memory (RAM), non-volatile storage. Other hardware, conventional and/or custom, may also be included.

Also, the eNodeB 104 and UE 106-1 include interface(s) 204-1, 204-2, collectively referred to as interfaces 204. The interfaces 204 may include a variety of software and hardware interfaces that allow the UE 106-1 and the eNodeB 104 to interact with each other. Further the eNodeB 104 may also contain software and hardware interfaces to interact with the LTE communication environment. Further, the interface(s) 204 may enable the eNodeB 104 to communicate with other communication and computing devices, such as web servers, other wireless networks and external repositories. The interfaces 204 may facilitate multiple communications within a wide variety of networks and protocol types, including wire networks, for example LAN, cable, etc., and wireless networks, for example, WLAN, cellular, satellite-based network, etc.

The eNodeB 104 and the UE 106-1 may further include one or more memory components, referred to as memory 206-1 and 206-2, respectively. The memory 206-1 and 206-2 are collectively, referred to as memories 206 hereinafter. The memories 206 may include any computer-readable medium known in the art including, for example, volatile memory, such as Static Random Access Memory (SRAM) and Dynamic Random Access Memory (DRAM), and/or non-volatile memory, such as Read Only Memory (ROM), erasable programmable ROM, flash memories, hard disks, optical disks, and magnetic tapes. The memories may also, be computer readable medium that may include any computer-readable medium known in the art including, for example, volatile memory, such as Random Access Memory (RAM) and/or non-volatile memory, such as flash.

The eNodeB 104 and the UE 106-1 may also, include modules 208-1, 208-2 and 210-1, and data 210-2, respectively. Each of the modules (i.e., present in the UE 106-1 and the eNodeB 104, are collectively referred to as modules 208 and data 210, respectively. The modules 208 include routines, programs, objects, components, data structures, and the like, which perform particular tasks or implement particular abstract data types. The modules 208 enable the present subject matter on the eNodeB 104 and the UE 106-1. Several other modules, such as the operating system, may be used for the functioning of the eNodeB 104 and the UE 106-1. The modules 208 supplement such modules on the eNodeB 104 and the UE 106-1. The data 210 serves, amongst other things, as a repository for storing data that may be fetched, processed, received, stored, cached or generated by one or more of the modules 208.

In an implementation, the modules 208-1 of the UE 106, includes a network attribute module 212, the demand computation module 108, and other module(s) 214-1. In said implementation, the data 210-1 of the UE 106 includes network data 216, request data, 218 and other data 220-1. The other module(s) 214-1 may include programs or coded instructions that supplement applications and functions, for example, programs in the operating system of the UE 106, and the other data 220-1 comprise data corresponding to other module(s) 208-2.

In operation, the network attribute module 212 may determine whether the UE 106-1 is associated with GBR-bearers or non-GBR-bearers. The UE 106-1 may be associated with GBR-bearers or with non-GBR-bearers, or with a combination of GBR-bearers and non-GBR-bearers. Depending on whether the UE 106-1 is associated with the GBR-bearers or non-GBR-bearers, the demand for resource blocks for uplink scheduling, is computed.

The demand for resource blocks are computed through the demand computation module 108 based on a plurality of physical layer characteristics and transport layer characteristics. In one implementation, the network attribute module 212, determines the physical layer characteristics and the transport layer characteristics. Once determined, the demand computation module 108 computes the demand in resource blocks based on the physical layer characteristics and the transport layer characteristics determined by the network attribute module 212. In one implementation, the physical layer parameters may include, but are not limited to the maximum reported rate of each of the UEs 106. Similarly, while computing the demand for resource blocks based on transport layer parameters, the UEs 106 may further, determine the demand based on the TCP and the UDP data flows.

In one implementation, the demand computation module 108 computes the demand for GBR-bearers of an $i^{th}$ UE based on the following relation:

$$De_i = \frac{1}{R_i} \times \left( \sum_j \frac{cwnd_i^j \times L}{\frac{RTT_i^j}{T_f} \times \beta} + \sum_v th_i^v \times T_f \times \beta \right) \quad \text{Equation 1}$$

where $T_f$ is the frame length or duration in seconds, is the fraction of uplink sub-frames in a frame and $R_i$ is the maximum reported rate in bps. As can be observed from Equation 1 the $R_i$ is the parameter indicative of the physical layer conditions, whereas the portion of Equation 1 within parentheses is indicative of the transport layer conditions. Consequently, the demand computed by the demand computation module 108 is based on both, the physical layer and transport layer of the communication channel. In one implementation, the network attribute module 212 determines the different parameters, as provided in Equation 1. The various parameters can either, be pre-defined for the communication channel under consideration or can be determined by techniques, conventionally known in the art. In one implementation, the demand for non-GBR-bearers is also, computed using Equation 1.

Furthermore, as would be appreciated by a person skilled in the art, the communication can be based on a variety of protocols. In one implementation, the communication, i.e., the data flow can be based on TCP or UDP. As should be noted, Equation 1 includes two portions within the parentheses. The former portion relates to TCP data flow, whereas the latter portion relates to the UDP data flow. For example, in cases where the data flow includes TCP traffic, the throughput $th_i^v$ for UDP is zero. For computing the demand due to TCP data flows, the congestion window $cwnd_i^j$ along with the Round Trip Time (RTT) of the transmission flow is determined. The RTT, also referred to as Round Trip Delay or Latency, is a measure of time for a packet to be sent from the UE 106 to a recipient through the eNodeB 104 and for the acknowledgement to be received by the UE, from the receiving end through eNodeB 104. If the acknowledgement is not received for a packet that was transmitted by the UE 106 within the time defined by RTT or in one implementation, its positive valued multiple, then the packet is considered to be lost and re-transmission of the packet may be initiated.

Therefore in case of TCP, the demand computed by the demand computation module 108 would be dependent, on the former portion of the Equation 1, included within the parentheses. Similarly, in case of UDP data flow, the congestion window variable $cwnd_i^j$ is nil, and consequently, the latter portion of the Equation 1 included within the parentheses, is factored for computing the demand for UDP flows.

Once the demand is computed by the demand computation module 108, the network attribute module 212 communicates the demand to the eNodeB 104 with which the UE 106-1 is in communication. In one implementation, the network attribute module 212 communicates the demand to the eNodeB 104 in the form of a request message. The request message may indicate the demand computed for the GBR-bearers, the demand computed for the non-GBR-bearers and the QCI. In the present implementation, the demand computed for GBR-bearers can be communicated as the Maximum Bit-Rate or the MBR, whereas the non-GBR demand is communicated as an Aggregate Maximum Bit Rate (UE-AMBR). The QCI can be based on a pre-defined value of QCI specified for the communication channel under consideration.

The network attribute module 212 sends a request to the eNodeB 104 for allocation of resources. The request may be sent in a pre-determined format, which defines the request message and the other parameters to be sent in the request message. The network attribute module 212 transmits the request along with the demand computed by the computation module. The network attribute module 212 may also, include other parameters determined by the network attribute module 212 including the TCP timeout for TCP transmission and tolerable delay for UDP transmission.

Once the demand is communicated to the eNodeB 104, the process for uplink scheduling further, proceeds with the eNodeB 104 determining the resource blocks to be allocated, and consequently, assigning the resource blocks to the appropriate UEs from amongst the UEs 106. In an implementation, the eNodeB 104 includes a resource allocation module 110, assignment module 222, and other modules 214-2. In said implementation, the data 210-2 of the eNodeB 104 may include operational data 224, cache data 226, and other data 220-2. The other module(s) 214-2 may include programs or coded instructions that supplement applications and functions, for example, programs in the operating system of the eNodeB 104.

In one implementation, the resource allocation module 110 allocates the resource blocks based on the requests received from one or more of the UEs 106. The resource allocation module 110 allocates the resource blocks, corresponding to each sub-frame of 'M' continuous frames, where 'M' is a positive non-zero integer. The allocation of 'M' continuous frames by the resource allocation module 110 is considered as, one iteration of allocation. The resource allocation module 110 may perform multiple iterations to allocate resource blocks to all received requests. The implementation of resource allocation module 110 according to an implementation of the present subject matter has been discussed with respect to TDD, although a person skilled in the art may appreciate that the present subject matter may be extended for a LTE communication environment 100 based on FDD with relevant modifications, without moving away from the spirit of the present subject matter. In TDD transmission, frames are allotted for transmission of data between the UE 106 and the eNodeB 104.

As would be conventionally known, any frame that is used for data to be transmitted by the UE 106 to the eNodeB 104, is characterized by a frame length of 10 milliseconds (ms). Each of such frames further, comprise 10 equal sub-frames of 1 ms duration each. Each sub-frame is further, divided into two equal slots, each of 0.5 msec. The sub-frame can either contain downlink or uplink data, or it can be a specific case of sub-frame with three fields, downlink pilot time slot, guard period and uplink pilot time slot. In TDD, the unit of allotment to UEs 106 for data transmission is a sub-frame. A resource blocks can be considered as radio resources which spread over 12 sub-carriers in the Frequency Domain and one slot (0.5 msec) in Time Domain.

In the present subject matter, K is considered to be the number of RBs associated with one slot. Since each frame is divided into 10 sub-frames, the total number of RBs available per frame for uplink transmission is denoted by $RB_{alloc}$ and may be computed as give below, $$RB_{alloc} = 2 \times K \times 10 \times \beta \qquad \text{Equation 2}$$

where $\beta$ is the fraction of a frame used for uplink transmission. In one implementation, the value of $\beta$ is about 0.6.

Returning to the process of allocating the resource blocks, once the GBR and non-GBR demand is communicated to the eNodeB 104, the resource allocation module 110 determines number of resource blocks for the UE 106-1. In one implementation, the resource allocation module 110 determines the total number of resource blocks that are available for allocation. In case, the number of resource blocks which are available are greater than the number of resource blocks determined as per the requests received from the UE 106-1, the resource allocation module 110 allocates resource blocks for the UE 106-1, which are associated with GBR-bearers. In case, the total number of available resource blocks is less than the resource blocks for the total number of incoming request, then the resource allocation module 110 allocates resource blocks for one or more of the UEs 106 in proportion of the MBR for the one or more of the UEs 106 under consideration. In one implementation, the basis for proportioning the MBR for allocating the resource blocks, is provided as follows (for the $i^{th}$:UE with GBR flows):

$$RB_{GBR} = \frac{RB_{alloc} \times MBR_i}{\sum_i MBR_i} \qquad \text{Equation 3}$$

For allocating the resource blocks for the non-GBR-bearers, the resource allocation module 110 may first determine the number of resource blocks that are left after allocation of resource blocks for the GBR-bearers. The remaining resource blocks are subsequently, utilized for allocating for the non- GBR-bearers. In one implementation, the number of resource blocks for non-GBR-bearers can be based on the following equation:

$$RB_{nonGBR} = RB_{alloc} - \Sigma_i MBR_i \quad \text{Equation 4}$$

It should be noted that the allocation of $RB_{GBR}$ as per the equations provided above is representative. Other mechanisms which determine allocation based on the demand, wherein the demand is computed based on physical layer characteristics and transport layer characteristics are also, within the scope of the present subject matter. The allocation proportion may be calculated in multiple ways, including associating different weights to unallocated requests, and subsequently prioritizing allocation according to the associated weights of the requests. For example, if in case, one of the UEs 106, say UE 106-1 had initially requested for resource blocks, but was not allocated in a first iteration, then a weight associated with the request, and may be incremented by 1. In such a case, the likelihood of the UE 106-1 being allocated resource blocks in the next iteration also increases, thereby ensuring that all requesting UEs 106 are provided with resource blocks.

In another implementation, the resource allocation module 110 within the eNodeB 104 allocates the resource blocks according to a packet delay budget. The packet delay budget may be understood as the maximum time delay in data transmission, between the UE and a gateway of the core network. In one implementation, one or more of UEs 106 are sorted based on an ascending order of the PDB values. Therefore, once a UE, for example, a UE 106-1, is determined to be associated with the least PDB value, the resource blocks are allocated to it. Subsequently, the UE with the next least PDB value, say UE 106-2, is taken up for allocation. For the allocation of the resource blocks to UE 106-2, the number of resource blocks available would now be less as a certain number of resource blocks would have been allocated to the UE 106-1 (as per the present example). In this manner, the process for allocation continues till all the resource blocks have been allocated to the UEs 106. With the present example, for each $i^{th}$ UE, if the number of resource blocks to be allocated can be $X_i$, then in one implementation, the number of resource blocks to be allocated for each of the UEs 106, is explained as follows.

In the given implementation, the number of resource blocks pending to be allocated, after $RB_{GBR}$ blocks have been allocated is given by $RB_{nonGBR}$. Then, the number of resource blocks available after allocation of $X_i$ blocks, may be given as $RB_{nonGBR} - X_i$. In the given implementation, the request sent from a UE with the next highest PDB, after catering to $UE_i$ is represented by $UE_{i+1}$. The number of resource blocks to be allocated to $X_{i+1}$ according to this implementation, may be taken as the lesser of the two values, where one value is the number of resource blocks requested by $UE_{i+1}$ and the other value is the number of remaining resource blocks $RB_{nonGBR} - X_i$. The allocation for the said implementation may be represented as follows $$X_i = \min(UEAMBR_i, RB_{nonGBR}) \quad \text{Equation 5}$$

where, 'i' is a reference to a UE 106 which has the least packet delay budget value.

Once the above indicated number of resource blocks is allocated for the UE under consideration, the next UE, for which the PDB is minimum is allocated the resource blocks based on the following:

$$X_{i+1} = \min(UEAMBR_{i+1}, RB_{nonGBR} - X_i) \quad \text{Equation 6}$$

The process of allocating to all the UEs in the order of the value of the packet delay budget is continued, till one of two end points is reached. Furthermore, it might be the case that for the last of the UEs 106, the number of resource blocks to be allocated is less than the requested resource blocks. In such a case, as per Equation 6 amongst the requested resource blocks and the available resource blocks, based on the lesser of the two values, the number of resource blocks is allocated to the UE.

In cases, where one or more of the UEs 106 are not allocated the requested resource blocks, various mechanisms can be used for ensuring that the resource blocks are allocated during the next cycle of allocation. For such resource blocks starved UEs 106, the starved UEs 106 may be first identified. In one implementation, the starved UEs 106 can be identified based on a stored time stamp and the number of sub-frames, in which no allocation could be achieved in a particular iteration. Once the starved UEs 106 are identified, each of the UEs 106 can eNodeB 104 associated with an incremented weighted value. Based on the incremented weighted value, such UEs 106 would be given higher preference for resource blocks allocation as compared to other UEs.

Once the allocation of resource blocks is computed, that is, once the number of resource blocks for each request from the UEs 106 is computed, the resource blocks then, have to be assigned to the UEs 106. The assignment module 222 assigns resource blocks to various requests from UEs 106. In one implementation, the assignment module 222 sorts the UEs 106 in the descending order of their reported transmission rate, represented by $R_i$. The UEs 106 are arranged in the descending order of the value of $R_i$ for all requests for GBR transmission. The resource blocks are assigned in the order of the UEs 106 by the eNodeB 104. Further, mapping is obtained by using the principle of opportunistic scheduling; i.e., assign appropriate RBs to UEs using the maximum coding efficiency as the criteria for RB selection. The eNodeB 104 uses a flag called $assign_{flag}$ for each UE 106. $assign_{flag}$ of an UE is set to zero, if resource blocks have not been assigned. $assign_{flag}$ is set to 1, if resource blocks have been assigned according to the request.

For non-GBR transmissions, the assignment module 222 orders UEs 106 in the ascending order of packet delay budget. Resources for non-GBR requests are assigned according to the order of the packet delay budget. Once the resource blocks are assigned for the respective UEs 106, the values for MBR, UE-AMBR, QCI and PDB can be updated.

Figure 3A:
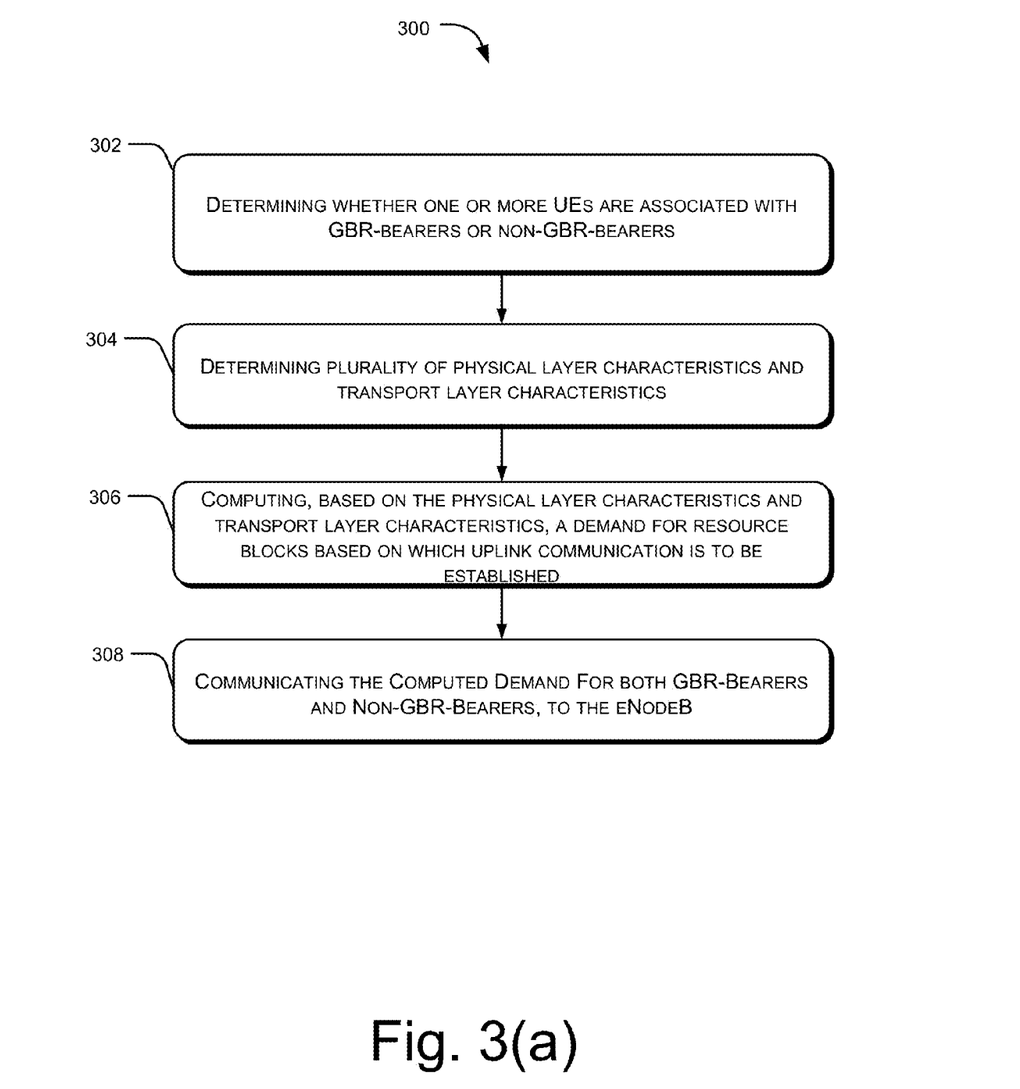
FIG. 3(a) illustrates a method of requesting resources for uplink scheduling based on transport layer and physical layer characteristics, according to an embodiment of the present subject matter.
Figure 3B:
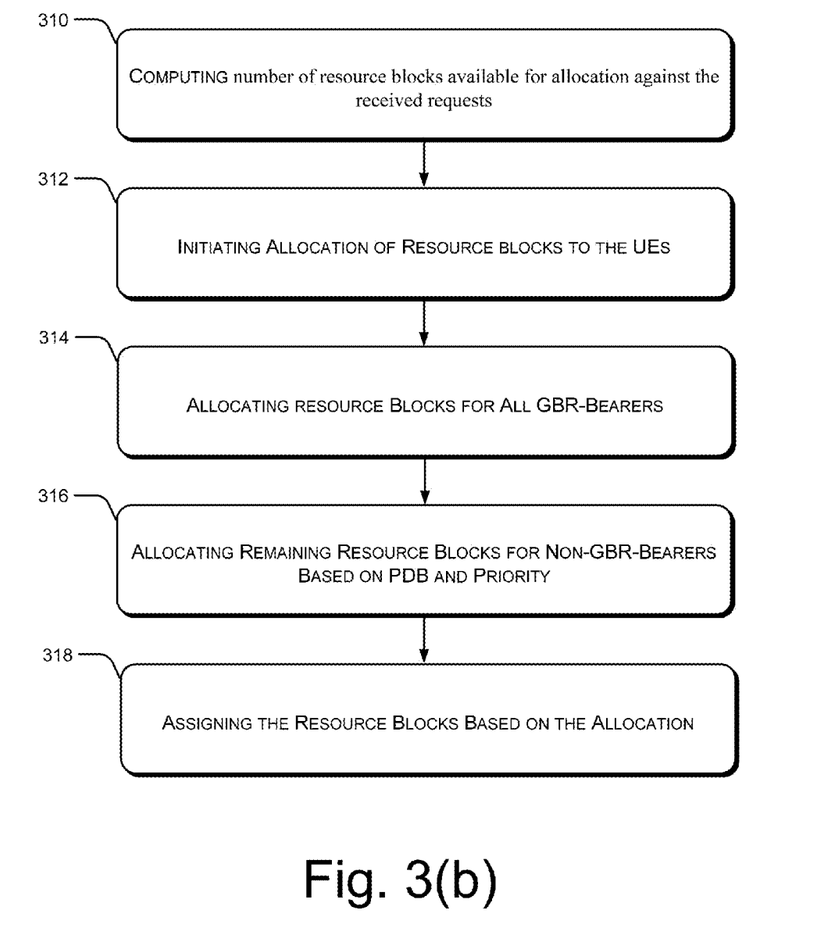
FIG. 3(b) illustrates a method of granting and assigning resources uplink scheduling, based on transport layer and physical layer characteristics, according to an embodiment of the present subject matter.

FIG. 3 illustrates a method 300 for uplink scheduling according to an implementation of the present subject matter. The method 300 is described over FIGS. 3(a) and 3(b), describing the demand calculation and the resource blocks allocation and assigning, respectively. The order, in which the method 300 is described, is not intended to be construed as a limitation, and any number of the described method blocks, can be combined in any order to implement the method 300 or any alternative methods. Additionally, individual blocks may be deleted from the method 300, without departing from the spirit and scope of the subject matter described, herein. Furthermore, the method 300 can be implemented in any suitable hardware, software, firmware, or combination thereof.

The method 300 may be described in the general context of computer executable instructions. Generally, computer executable instructions can include routines, programs, objects, components, data structures, procedures, modules, functions, etc., that perform particular functions or implement particular abstract data types. The method 300 may also, be practiced in a distributed computing environment, where functions are performed by remote processing devices that are linked through a communications network. In a distributed computing environment, computer executable instructions may be located in both local and remote computer storage media, including memory storage devices. The method 300 may be implemented in computing devices, such as computers, servers, and the like.

Referring to FIG. 3 at block 302, it is determined whether one or more user devices or UEs are associated with GBR-bearers or non-GBR-bearers. In one implementation, the network attribute module 212 may determine which of the plurality of bearers are associated with the one or more of the UEs 106. For example, one of the UEs 106, say UE 106-1 can be associated with GBR-bearers or non-GBR-bearers. In one implementation, the UE 106-1 may be associated with a combination of GBR-bearers and non-GBR-bearers.

At block 304, a plurality of physical layer characteristics and transport layer characteristics are determined. For example, the network attribute module 212 may determine a maximum reported rate $R_i$ of each of the UEs 106, as a physical layer characteristics and congestion window, throughput and round trip time (RTT), as a transport layer characteristics.

At block 306, based on the physical layer characteristics and transport layer characteristics, a demand for resource blocks based on which uplink communication is established, is computed. In one implementation, the demand computation module 108 computes the demand for resource blocks for one or more of the UEs 106. The demand computation module 108 may compute the demand separately for GBR-bearers and non-GBR-bearers. In another implementation, the demand is computed based on Equation 1, as provided previously. In a yet another implementation, for the transport layer, the demand may be computed based on TCP or UDP data flows.

At block 308, once the demand is computed, the same is communicated to the eNodeB for uplink scheduling. For example, the network attribute module 212 communicates request for demand as a request message to the eNodeB 104. In one implementation, the request message specifies the demand computed for GBR-bearers, demand computed for non-GBR-bearers and a QCI parameter. The QCI can be based on a pre-defined value of QCI specified for the communication channel under consideration. The UE 106 may transmit one or more requests to the eNodeB 104. In another implementation, the request messages can be obtained by the eNodeB 104 based on one of a contention based and polling based mechanism.

Once the demand is communicated, the allocation and assignment of resource blocks is undertaken at the eNodeB. This is indicated in FIG. 3(b), where the method 300 proceeds but at the eNodeB. At block 310 the number of resource blocks available for allocation against the received requests is computed. The computation may depend on a duplex mode of the physical layer, which may be either TDD or FDD.

At block 312, the process for allocation of resource blocks is initiated. In one implementation, the resource allocation module 110 determines and allocates the resource blocks based on the incoming request messages received from one or more of UEs 106.

At block 314, as part of the allocation, the resource blocks for GBR-bearers are allocated first. Subsequently, depending on the remaining resource blocks, the resource blocks to be allocated for non-GBR-bearers are determined.

At block 316, subsequently the remaining resource blocks are considered for allocating to the non-GBR-bearers. In another implementation, the resource allocation module 110 within the eNodeB 104 allocates the resource blocks according to a packet delay budget or a priority associated with the UEs 106. In one implementation, the one or more UEs 106, are sorted based on an ascending order of the PDB values. In another implementation, the resource blocks are allocated for non-GBR-bearers based on Equation 5, as provided above.

At block 318, the allocated resource blocks are assigned to the respective UEs depending on an order of the UEs. The UEs may be ordered with respect to physical layer parameters of the UE 106. Once the allocation of resource blocks is computed, that is, once the number of resource blocks for each request from the UEs 106 is computed, the resource blocks then, have to be assigned to the UEs 106. The assignment module 222 assigns resource blocks to various requests from UEs 106 to the resource blocks. In one implementation, the assignment module 222 sorts the UEs 106 in the descending order of their reported transmission rate, represented by $R_i$. The resource blocks are assigned in the order of the UEs 106 by the eNodeB 104.

Figure 4A:
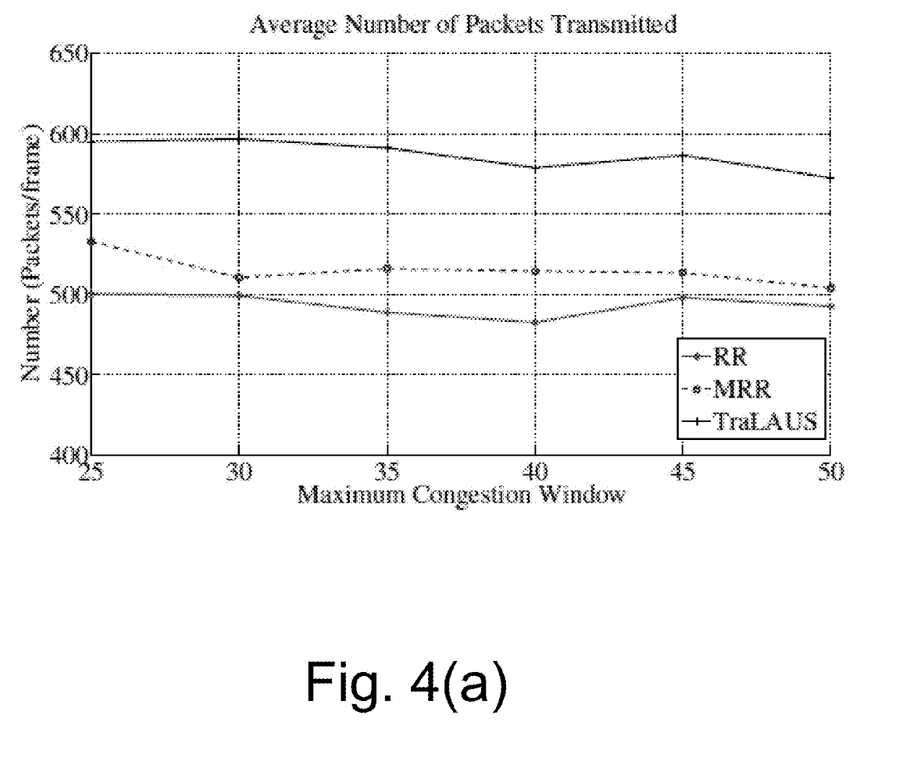
FIG. 4(a) illustrates a comparison of average number of packets transmitted in a environment implementing uplink scheduling based on transport layer and physical layer characteristics, according to an embodiment of the present subject matter.

FIG. 4(a) represents the performance of the present subject matter against systems known in the prior art such as round robin and modified round robin. The performance of the present subject matter was measured as a part of an experimental set up. For the present implementation, the experimental set up included an environment with one eNodeB 104 and five UEs 106, placed at a random distance from eNodeB 104. The physical, MAC and transport layers functionalities (uplink flows) with LTE release 10 setting. For the sake of simplicity, only TCP flows have been considered. Further, each UE 106 is considered to have one flow, and each flow is considered to start at a random time. For the present example, each UE 106 is considered to have infinite buffer at its interface for storing the transmission related data. A path loss due to distance, γ=4 and path loss is considered to follow Log-normal fading with zero mean and a σ=8 db. The channel is kept fixed for a duration of M=10 frames.

For fast fading, the Rayleigh fading model is considered and the channel gain due to fast fading is modeled as a complex Gaussian random variable, that is, the power gain is an exponential random variable with mean Φ and transmission power is chosen such that the expected SINR received due to log normal shadowing, Rayleigh fading and the path loss for an UE it the cell edge is more than $SINR_{th}$ for transmission. The other simulation parameters are given below in Table 1:

TABLE 1

| Simulation Parameter | Value |
| --- | --- |
| Channel Bandwidth | 10 MHz |
| LTE Deployment Type | TDD |
| Slot Format | 0 |
| Modulation Schemes | QPSK, 16-QAM, 64-QAM |
| Desired Bit Error Rate | $10^{-6}$ |
| Frame Length $T_f$ | 10 ms |
| Sub-frame length | 1 ms |
| $T_{ul}:T_{dl}$ | 6:4 |
| Packet Size (L) | 8000 bits |
| Number of resource blocks per frame | 50 |

Figure 4B:
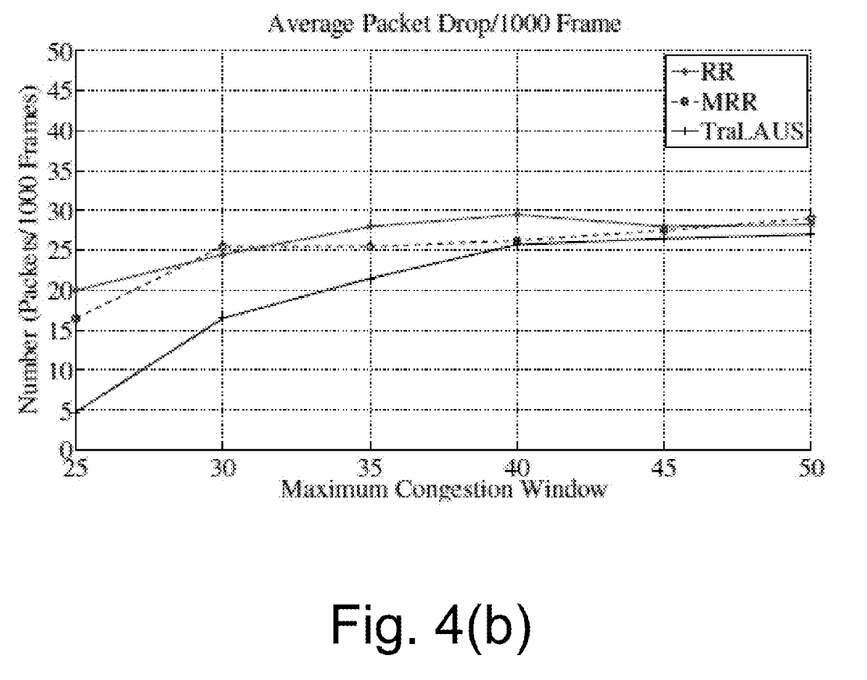
FIG. 4(b) illustrates a comparison of average packet drop in a environment implementing uplink scheduling based on transport layer and physical layer characteristics, as per an embodiment of the present subject matter.
Figure 4C:
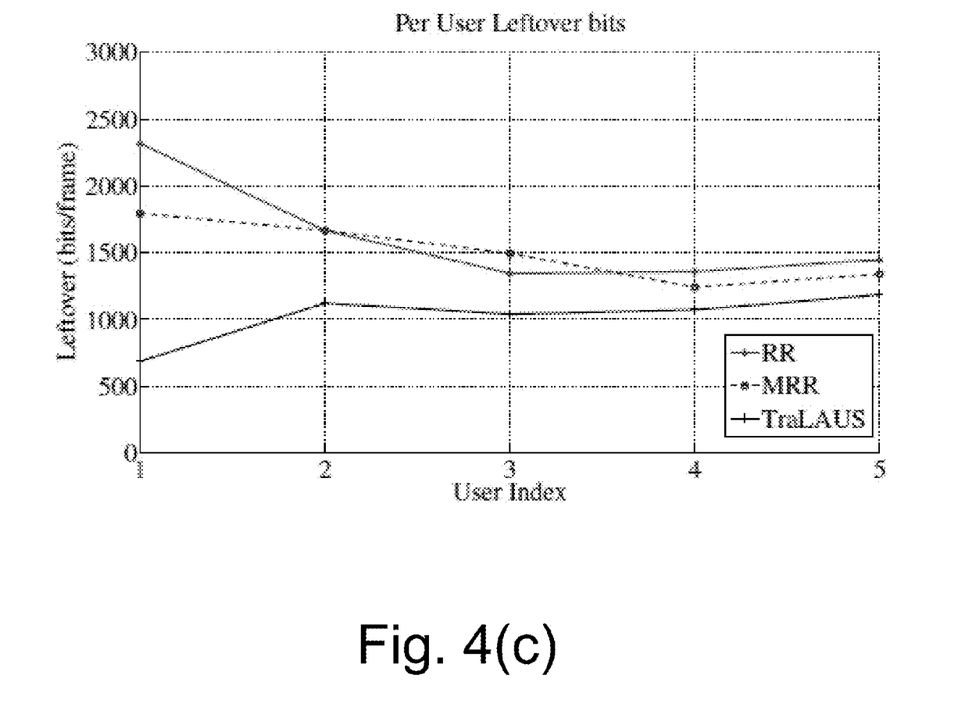
FIG. 4(c) illustrates a comparison of number of Leftover bits in a environment implementing uplink scheduling based on transport layer and physical layer characteristics, as per an embodiment of the present subject matter.
Figure 4D:
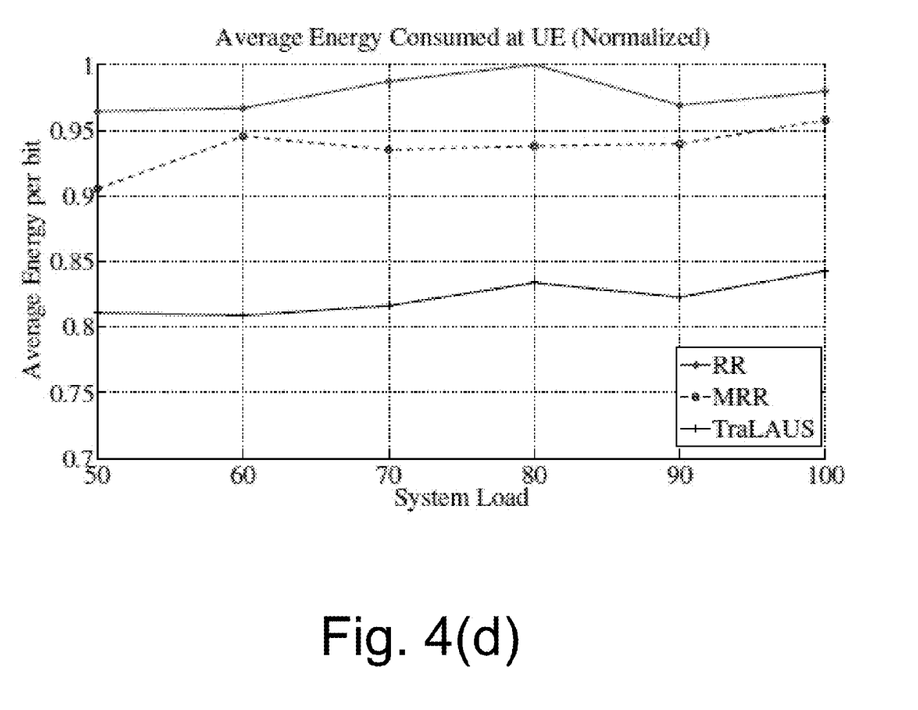
FIG. 4(d) illustrates a comparison of average energy consumed per user equipment in a environment implementing uplink scheduling based on transport layer and physical layer characteristics, as per an embodiment of the present subject matter.

FIGS. 4(a)-(d) exhibits comparisons between implementations based on the present subject matter and scheduling techniques based on Round Robin (RR) mechanism and Modified Round Robin (MRR) mechanisms. For example, from FIG. 4(a), it can be observed that the uplink scheduling as per the present subject matter (depicted by graph 406a) exhibits higher number of packet transmission per frame as compared to that of Round Robin (RR) and Modified Round Robin (MRR) scheduling schemes (402a, 404a respectively), irrespective of maximum congestion window (maximum load) selected by the TCP flows. It can also be observed that as per one embodiment of the present subject matter a higher packet transmission over RR and MRR is achieved. Continuing with the present experimental setup, FIG. 4(b) illustrates the variations in the average number of packets dropped for every 1000 frames. As can be clearly seen, the average number of packets is minimum for the present implementation (depicted by graph 406b), when compared to scheduling as per other conventionally known techniques (402b, 404b respectively for RR and MRR based techniques). From FIG. 4(c), it can be observed that with the systems and methods of the present subject matter also exhibit a lesser number of packets are left over without allocation at each UE (depicted by graph 406c). when compared with RR and MRR based techniques (402c, 404c respectively). Furthermore, the average energy consumed per data bit one or more of UEs 106 at different system load and compare the performance of the schedulers, significantly less as compared to other scheduling mechanism, as shown in FIG. 4(d) for the present implementation (depicted by 406d), when compared with scheduling techniques based on RR and MRR (402d, 404d respectively).

Although the description, implementations and advantages of methods and systems for the present subject matter have been described in a language specific to structural features and/or methods, it is to be understood that the present subject matter is not necessarily limited to the specific features or methods described. Rather, the specific features and methods are disclosed as implementations for the present subject matter.

We claim:

1. A method for uplink scheduling over a communication channel in a communication network including at least one User Equipment (UE) and a base station, the method comprising:
   determining whether the UE is associated with at least one of Guaranteed Bit Rate (GBR) bearers and non-Guaranteed Bit Rate (non-GBR) bearers;
   for each of the GBR-bearers and the non-GBR-bearers, computing a demand for resources for establishing an uplink communication, wherein the demand is computed based on physical layer characteristics and transport layer characteristics associated with the communication channel based on the relation:

$$De_i = \frac{1}{R_i} \times \left( \sum_j \frac{cwnd_i^j \times L}{\frac{RTT_i^j}{T_f} \times \beta} + \sum_v th_i^v \times T_f \times \beta \right)$$

where $T_f$ is a frame length of duration in seconds, $\beta$ is a fraction of uplink sub-frames in a frame and $R_i$ is a maximum reported rate in bps;
   communicating the demand as a request message to the base station; and
   in response to the request message, receiving an allocation of resources for uplink scheduling from the base station.

2. The method as claimed in claim 1, wherein the resources are defined by resource blocks.

3. The method as claimed in claim 1, wherein the physical layer characteristics comprise a maximum reported rate.

4. The method as claimed in claim 1, wherein the transport layer characteristics comprise one of Round Trip Time (RTT), congestion window (cwnd) and throughput.

5. The method as claimed in claim 1, wherein the transport layer characteristics are further, based on one of Transmission Control Protocol (TCP) and User Datagram Protocol (UDP).

6. The method as claimed in claim 1, wherein the request message is communicated to the eNodeB based on one of contention based techniques and polling based techniques.

7. The method as claimed in claim 1, wherein the request message further comprises the computed demand for GBR-bearers, the computed demand for non-GBR-bearers and a quality class indicator (QCI).

8. The method as claimed in claim 1, wherein the receiving an allocation is based on computing the resource blocks to be allocated, the computing further comprising:
   for a total number of resource blocks being greater than resource blocks determined in response to the request message, allocating a first number of resource blocks to the GBR-bearers; and
   for the remaining number of resource blocks, allocating the resource blocks for non-GBR-bearers based on one of Packet Delay Budget (PDB), priority associated with the UE having the non-GBR-bearers and the number of available resource blocks.

9. An eNodeB for uplink scheduling for a plurality of UEs in communication with the eNodeB, the eNodeB comprising:
   a processor; and
   a memory coupled to the processor, wherein the processor is capable of executing a plurality of modules stored in the memory, and wherein the plurality of modules comprising:
      a resource allocation module to:
         based on a demand for resource blocks received from at least one of plurality of UEs, determine number of the resource blocks to be allocated for the at least one UE, wherein the demand is based on physical layer characteristics and transport layer characteristics based on the relation:

$$De_i = \frac{1}{R_i} \times \left( \sum_j \frac{cwnd_i^j \times L}{\frac{RTT_i^j}{T_f} \times \beta} + \sum_v th_i^v \times T_f \times \beta \right)$$

where $T_f$ is a flame length of duration in seconds, $\beta$ is a fraction of uplink sub-frames in a frame and $R_i$ is a maximum reported rate in bps;
   and wherein the transport layer characteristics are based on one of TCP and UDP;
   for Guaranteed Bit Rate (GBR) bearers, allocate resource blocks from a total number of resource blocks;
   determine remaining resource blocks from the total number of resource blocks;
   allocate remaining resource blocks to non-Guaranteed Bit Rate (non-GBR) based on a Packet Delay Budget (PDB) and a priority associated with the UE, wherein the PDB comprises one of TCP timeout for the TCP and tolerable delay for the UDP; and
   based on the allocating, assign the resource blocks to the UE, for scheduling uplink communication with the at least one UE.

10. The eNodeB as claimed in claim 9, wherein the resource blocks are allocated to the GBR-bearers based on determining whether resource blocks are less than the total number of the resource blocks.

11. The eNodeB as claimed in claim 9, wherein the demand is received in form of request message indicating at least one of a computed demand for resource blocks for GBR-bearers, a computed demand for resource blocks for non-GBR-bearers and a quality class indicator (QCI).

12. The eNodeB as claimed in claim 11, wherein the QCI is further, indicative of the priority associated with the UE.

13. The eNodeB as claimed in claim 9, wherein the processor implemented resource allocation module:
for a UE associated with the GBR-bearers and the non-GBR-bearers, determines a proportion of the GBR-bearers; and
on determining resource blocks being greater than the total number of the resource blocks, allocates resource blocks to the GBR-bearers based on the proportion of GBR-bearers.

14. The eNodeB as claimed in claim 9, wherein the allocating further comprises:
determining a PDB value associated with the plurality of UEs in communication with the eNodeB;
sorting the UEs based on an ascending order of the PDB value;
allocating the resource blocks for the non-GBR of the UE with the lowest PDB value; and
subsequently, allocating resource blocks for other UEs, based on the sorting and based on the available number of resource blocks.

15. The eNodeB as claimed in claim 9, further comprising an assignment module to:
determine the number of resource blocks for which coding efficiency is maximum; and
assign the resource blocks based on the determining.

16. A non-transitory computer-readable medium having embodied thereon a computer program for executing a method for uplink scheduling over a communication channel in a communication network including at least one User Equipment (UE) and a base station, the method comprising:
determining whether the UE is associated with at least one of Guaranteed Bit Rate (GBR) bearers and non-Guaranteed Bit Rate (non-GBR) bearers;
for each of the GBR-bearers and the non-GBR-bearers, computing a demand for resources for establishing an uplink communication, wherein the demand is computed based on physical layer characteristics and transport layer characteristics associated with the communication channel based on the relation:

$$De_i = \frac{1}{R_i} \times \left( \sum_j \frac{cwnd_i^j \times L}{\frac{RTT_i^j}{T_f} \times \beta} + \sum_v th_i^v \times T_f \times \beta \right)$$

where $T_f$ is a frame length of duration in seconds, $\beta$ is a fraction of uplink sub-frames in a frame and $R_i$ is a maximum reported rate in bps;
communicating the demand as a request message to the base station; and
in response to the request message, receiving an allocation of resources for uplink scheduling from the base station.

* * * * *